United States Patent [19]
Dailey et al.

[11] Patent Number: 6,161,106
[45] Date of Patent: Dec. 12, 2000

[54] PERISHABLE MEDIA SYSTEM AND METHOD OF OPERATION

[75] Inventors: Conan B. Dailey, Scottsdale; Michael S. Lebby, Apache Junction, both of Ariz.

[73] Assignee: Motorola, Inc., Schaumburg, Ill.

[21] Appl. No.: 09/124,542

[22] Filed: Jul. 28, 1998

[51] Int. Cl.[7] .................................................. G11B 7/00
[52] U.S. Cl. ........................ 707/102; 707/6; 707/101; 707/104; 707/201
[58] Field of Search ........................... 707/102, 101, 707/200; 369/271, 273, 116, 275.1, 44.23, 44.38, 44.13, 110

[56] References Cited

U.S. PATENT DOCUMENTS

| | | | |
|---|---|---|---|
| 5,448,551 | 9/1995 | Miyagawa et al. | 369/271 |
| 5,732,061 | 3/1998 | Kirino et al. | 369/116 |
| 5,774,295 | 6/1998 | Tsai | 360/77.03 |
| 6,075,764 | 6/2000 | Jacobowitz et al. | 369/275.1 |
| 6,081,446 | 6/2000 | Brug et al. | 365/171 |
| 6,081,489 | 6/2000 | Decusatis et al. | 369/44.38 |

*Primary Examiner*—Thomas G. Black
*Assistant Examiner*—Thuy Do
*Attorney, Agent, or Firm*—Eugene A. Parsons; William E. Koch

[57] ABSTRACT

A perishable media system including a media writer for writing information to a perishable media information storage mechanism, a media reader for reading information written on the perishable media information storage mechanism, a data access eliminator for eliminating access to the information written on the perishable media information storage mechanism, and an interpretation mechanism. The system operates by writing information to the perishable media information storage mechanism with the media writer, thereafter reading the information with the media reader. Once the information is read by the media reader and interpreted by the interpretation mechanism, the data access eliminator, in the form of a light, magnetic field, or bias eliminates access to the information.

19 Claims, 2 Drawing Sheets

PERISHABLE MEDIA SYSTEM AND METHOD OF OPERATION

FIELD OF THE INVENTION

The present invention pertains to the field of media information systems, and more particularly to the elimination of information contained on an information storage mechanisms when read by a reader and method of operation.

BACKGROUND OF THE INVENTION

Information storage mechanisms currently found in today's market include many durable media formats. The most common of these durable medias are compact discs (CDs), digital video discs (DVDs), and magnetic tapes. Durable medias are commonly found in many industries including the movie and music industry, and are often utilized in the dissemination of consumer information. At a basic level, the information contained on existing durable media often lasts an inappropriately long time given the content, sensitivity, or application of the contained information. Forecasts, census data, safety procedures, and the like, all have lifetimes after which the data can no longer be relied upon as current. Unfortunately, the durable media on which it is distributed lasts beyond this useful life allowing careless individuals the opportunity to misuse the outdated information.

In the video rental industry, movies are typically contained on durable media which last beyond the rental period, thus the media must be returned to the store. This is both inconvenient for the consumer and the vendor in keeping track of the media. In the instance of sensitive material that is contained on a durable media, the information must be tracked extensively and explicitly destroyed at a costly price, in that the data will last for an extended period of time.

One of the most common of the durable medias, CD-Rs (recordable compact discs), employs dyes and variants which exhibit widely different tolerances to light exposure in determining the media lifetime. Specifically, cyanine dyes are most commonly used in CD-Rs which are considered to be relatively stable and therefore provide for recordation of data for an extended period of time. In many instances, such as those described above, this extended period of time in which the recordation of information is contained on the durable media presents a problem.

Thus, there is a need for a media system in which information can be written on an information storage mechanism that upon the interaction with a media information system reader, the stored information is eliminated or access to the information is eliminated.

Accordingly, it is highly desirable to provide for a new and improved perishable media system including a means for writing information onto a perishable media information storage mechanism, wherein the information on the media information storage mechanism is deemed perishable in nature upon the happening of a preset determined occurrence. The compatible media reader includes a means for eliminating information or eliminating access to information stored on the media information storage mechanism, and an interpretation mechanism.

It is yet a further purpose of the present invention to provide for a new and improved media system in which information recorded on a compatible media information storage mechanism is eliminated or access to the information is eliminated upon interaction with the media reader based on a predetermined use factor.

SUMMARY OF THE INVENTION

The above problems and others are substantially solved and the above purposes and others are realized in an perishable media system, including a means for writing information to a perishable media information storage mechanism, a means for reading information written on the perishable media information storage mechanism. The means for reading the information includes a means for eliminating the information or eliminating access to the information written on the perishable media information storage mechanism, once the information has been read by the means for reading. The perishable media disc generally includes a substrate, a data layer for recording data thereon the perishable media information storage mechanism, including a material responsive to at least one predetermined access elimination factor, and a protective lacquer coating. The means for reading generally includes a means for eliminating access to the perishable media information storage mechanism dependent upon the perishable media structure.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

During the course of this description, like numbers are used to identify like elements according to the different figures that illustrate the invention. The present invention is based on utilizing a reader that has fabricated as a part thereof a means for data access elimination when interacting with a perishable media information storage mechanism. The system includes a means for writing information to the media information storage mechanism prior to reading by the media reader.

Figure 1:
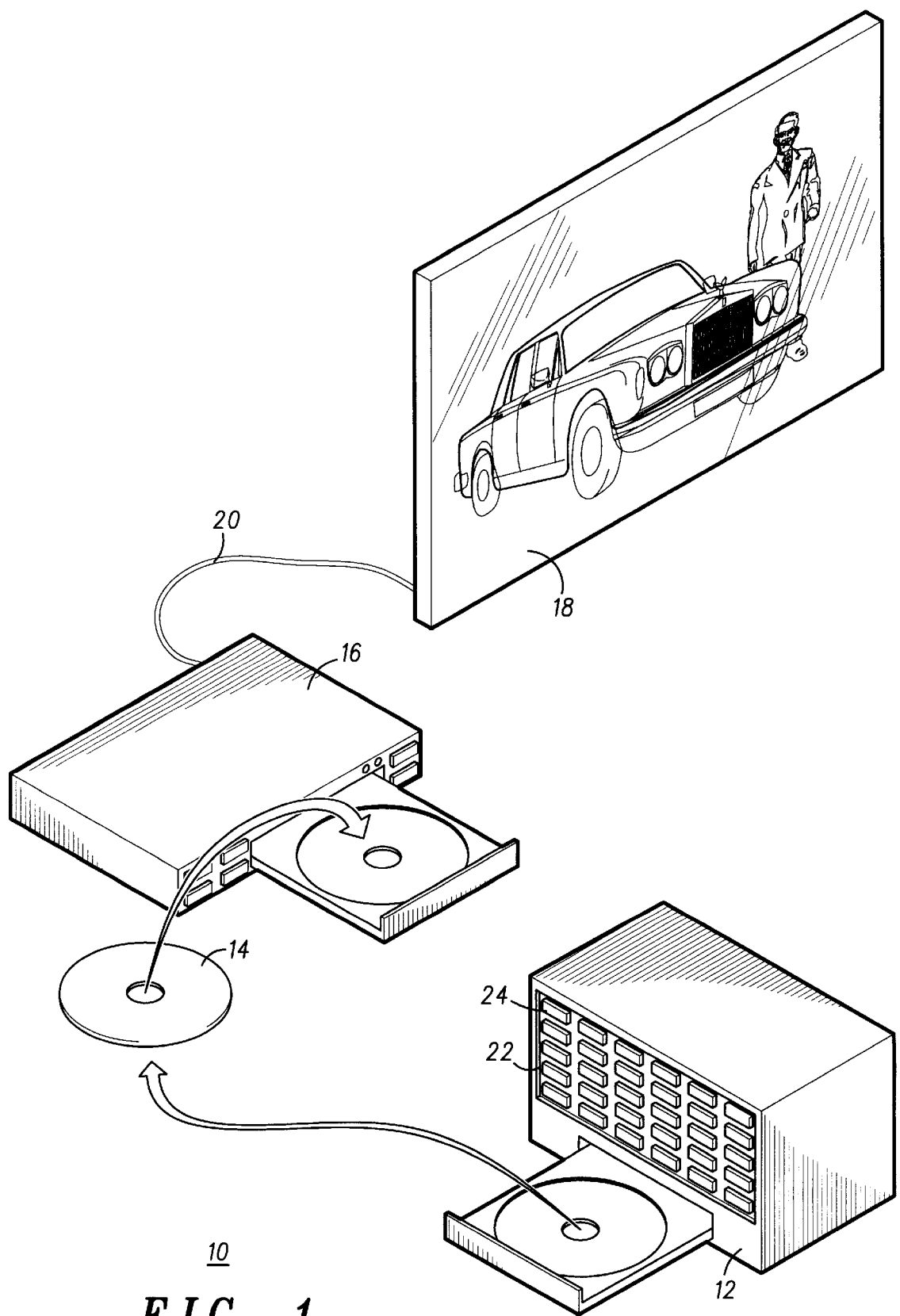
FIG. 1 is a simplified isometric diagram of a perishable media system according to the present invention.
Figure 2:
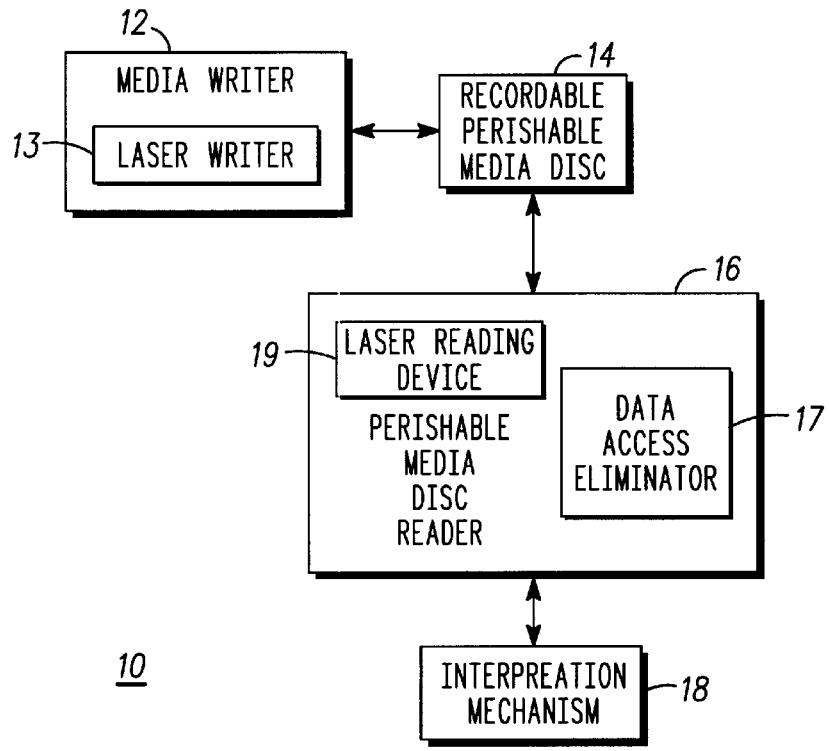
FIG. 2 is a simplified block diagram of a perishable media system according to the present invention.

Referring now to FIGS. 1 and 2, illustrated in isometric diagram and block diagram, respectively, is a perishable media system 10 according to the present invention. Perishable media system 10 includes a media writer 12, a perishable media information storage mechanism 14, a media reader 16, an interpretation mechanism 18 and an interface 20. Media writer 12, in this particular embodiment is fabricated as a programmed user device on which is provided a plurality of user control keys 22. It should be understood that user control keys 22 are specific to this preferred embodiment, and that alternate user interface means are anticipated by this disclosure such as a voice interface, a touch screen, joysticks, mouse, or the like. As illustrated, user control keys 22 are provided as part of a display 24. Media writer 12 as illustrated is a stand alone device which may be provided in a free-standing kiosk type structure that would allow for the downloading of music, video, consumer information, or the like to media information storage mechanism 14. In this particular embodiment, media writer 12 includes a laser writer 13 for the downloading, or writing, of information to media information storage mechanism 14 which contains recordable properties. It should be understood that alternative means for writing information to perishable media information storage mechanism 14 such as the use of electromagnetic techniques, and opto-magnetic techniques are anticipated by this disclosure.

Media information storage mechanism 14 generally includes a recordable data layer, which in response to predetermined factors and conditions is perishable, thus eliminating access to recorded data by simply blocking access or actually destroying the data. The basic predetermined factor utilized for the elimination of access to the recorded data is based on use. More specifically, data recorded on media information storage mechanism 14 having included as a part thereof a perishable data layer, is readable based on a use factor. When the recorded data on the media disc is read utilizing reader 16 such as a CD player, or the like, the data read is automatically erased. This perishing of data is typically based on the use of a perishable data layer that utilizes decayable dyes, magnetic properties, such as magnetoresistive random access memory (MRAM), liquid crystal materials, or photosensitive materials. During operation, that portion of data that has been read in response to either magnetic forces, a bias, or light exerted by the player becomes inaccessible either through destruction of the recorded information or by denying access to the recorded information, leaving unread portions in an unaltered state.

Media reader 16 is fabricated generally similar to a standard CD or DVD player with the addition of data access elimination capabilities. The ability to deny access to information, or destroy recorded information, is based on the type of perishable media disc utilized as enumerated above. Accordingly, media reader 16 includes a means for data access elimination, referred to in the broadest sense as a data access eliminator 17. Dependent upon the type of media disc, (decayable dye based, liquid crystal based, MRAM based, photosensitive based, etc.) data access eliminator 17 includes a laser, characterized as generating a light of a specific wavelength, a means for generating a magnetic field, or a means for generating a bias. In each instance, information recorded on media information storage mechanism 14 would be either destroyed or access to the information would be eliminated.

Figure 3:
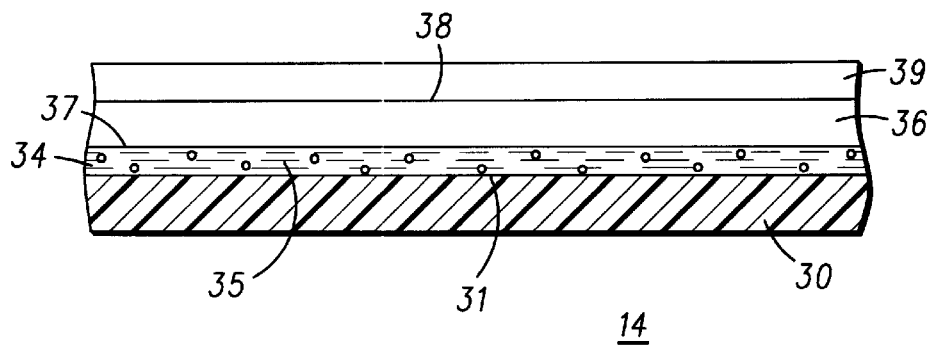
FIG. 3 is a simplified sectional view, illustrating a portion of a perishable media information storage mechanism including a data layer, the data layer including properties responsive to a predetermined data elimination use factor, according to the present invention.

Referring now to FIG. 3, illustrated is a sectional view of recordable media information storage mechanism 14. More specifically, illustrated is a portion of a recordable media information storage mechanism 14. Recordable media information storage mechanism 14 includes a substrate 30 having an uppermost surface 31. Substrate 30 is generally composed of a clear optical quality polycarbonate transparent material. Substrate 30 is formed through injection molding techniques. Substrate 30 has formed on uppermost surface 31 a data layer 34. In this particular embodiment, data layer 34 is formed of a decayable dye material 35 such as Bis(p-dimethylaminophenyl)phenyl-4-methylaminomethylium chloride; Methyl Violet; CI Basic. Violet 1 (4-NHMe) $C_{24}H_{28}N_3Cl$(393.5), Bis(4-dimethylaminophenyl) streptopolymethinecyanine (n=2) $C_{21}H_{25}N_2Cl$ (340.5), 4-(4'-Dimethylaminostyryl)-2,6-diphenyltelluropyrylium tetrafluoroborate(n=1; tetrafluoroborate) $C_{27}H_{24}NBF_4Te$(576.4), Bis (chalcogenopyrylo) methine (n=1; X=S; Y=Se; Z=$ClO_4$) $C_{37}H_{27}O_4ClSSe$(681.6), other dyes from the polymethine family or basic dyes, or other typically known dyes utilized in the information storage field when fabricated in a thin state, typically less than 100 nm in thickness.

Data layer 34 serves to record data when recording laser 13 (FIG. 2) selectively changes the characteristics of dye layer 35 by simply melting portions of it slightly. This causes portions of data layer 34 to become translucent so that the reading laser device 19 (FIG. 2) is reflected back to the reader's sensors rather than absorbed.

As stated, in this particular embodiment, data layer 34 is fabricated from a decayable dye material. Dye material 35 includes inherently weaker chemical bonds which accelerate its destruction, thus the loss of recordable data in response to a predetermined use factor. Dye material 35 in an un-melted state absorbs laser wavelengths used to read data. To represent bits, spots of dye material 35 on media information storage mechanism 14 are melted which allows the light from the disc reader 16 to reflect back to the detector. When dye material 35 breaks down, due to heat or exposure to light, reflection is enabled, effectively destroying the data recorded on the media information storage mechanism 14. During operation of media information storage mechanism 14 having data recorded thereon, dye material 35 is decayable after information is read by reader 16. More specifically, media information storage mechanism 14 which is typically able to be read by a standard CD reader, is exposed to data access eliminator 17, which in this particular example is a specific laser light. This exposure to laser light causes the melting of dye material 35, thereby eliminating access to the data recorded on media information storage mechanism 14 by actually destroying the data. Media information storage mechanism 14, more particularly dye material 35 is fabricated to allow for the melting of dye material only to the extent of the actual data read. Accordingly, the user of media information storage mechanism 14 would have the ability to stop the reading of data contained on media information storage mechanism 14 at a random point without the destruction of data unread and remaining on media information storage mechanism 14. It should be understood that a combination of use and time factors can be combined so as to permit the destruction of data recorded on media information storage mechanism 14 at a certain predetermined time, i.e. ten days from time of recordation, regardless of whether or not the information has been read by reader 16.

Media information storage mechanism 14 has positioned on an uppermost surface 37 of recordable data layer 34, a reflective layer 36. Reflective layer 36 is composed of a metal material positioned on top of dye material 35. Reflective layer 36 serves to reflect the reading laser beam 19 (FIG. 2) back to the reading assembly. In a preferred embodiment, reflective layer 36 is formed of a 24K gold material, but the use of silver and aluminum are anticipated by this disclosure.

There is positioned on an uppermost surface 38 of reflective layer 36, a protective layer 39. Protective layer 39 is typically formed of a protective lacquer coating and serves to protect the underlying structure. Protective layer 39 is spincoated in a thin layer on top of reflective layer 36 to protect it from abrasion and corrosion.

Alternative embodiments of media information storage mechanism 14 are also disclosed in which data layer 34 is essentially formed as a liquid crystal memory cell, includes MRAM, or includes a photosensitive material. In the instance where data layer 34 is formed as a liquid crystal memory cell, steps are completed so as to record varying data information in data layer 34 utilizing laser writing techniques in combination with liquid crystal material characteristics. During operation, data recorded within data layer 34 is read by reader 16 (FIGS. 1 and 2). Once data is read, in response to an exerted bias, that portion of data contained in data layer 34 is destroyed, thus erased. The destruction of data is accomplished by biasing portions of the liquid crystal memory cell, thus changing the molecular structure of liquid crystal material contained therein.

Data layer 34 can additionally be formed to include a photosensitive material such as silver halide, or other similar material characterized as undergoing a change in composition upon the exposure to light exerted by reader 16 (FIGS. 1 and 2) and a recording medium. The recording medium is disclosed as being formed of an organic dye material, such as cyanine, typically used for the recordation of data therein. As an alternative, data can be formed as part of substrate 30, and is pressed into the uppermost surface 31 of substrate 30 by a "stamper" during the injection molding process. The recording medium serves to record data when recording laser 13 (FIG. 2) selectively exposes portions of the recording medium. This causes portions of the recording medium to become either opaque so that reading laser beam 13 (FIG. 2) is refracted rather than reflected back to the reader's sensors or recording medium becomes translucent so that the reading laser beam 13 is reflected back to the reader's sensors. The photosensitive material is formed on an uppermost surface of the recording medium and includes light reactive properties that make it reactive to the exposure of light, hence reactive to the reading, or use, when data is read in reader 16 (FIGS. 1 and 2).

During operation of media disc 14 having data recorded therein the recording medium or stamped thereon a surface 31 of substrate 30, the photosensitive material is initially transparent to the wavelength of light utilized by reader 16 (FIGS. 1 and 2). After information is read by the reading laser 16, the photosensitive material changes from a transparent state to an opaque state, thereby eliminating access to the recorded information in that reflection is prevented, effectively eliminating access to the data on the media information storage mechanism 14. Media information storage mechanism 14, more particularly the photosensitive material is fabricated to allow for the exposing to the point of elimination of access of recorded data only to the extent of the actual data read. Accordingly, the user of media information storage mechanism 14 would have the ability to stop the reading of data contained on media information storage mechanism 14 at a random point without the destruction of data unread and remaining on media information storage mechanism 14.

Additional alternatives for data layer 34 include the incorporation of a plurality of magnetoresistive memory cells, utilizing magnetoresistive random access memory (MRAM) technology in which data is stored in the form of magnetization vectors. During use, data is recorded in data layer 34, more particularly the memory cells utilizing magnetic fields. Data is read by reader 16 (FIGS. 1 and 2) that has incorporated as data access eliminator 17 (FIG. 2) the ability to exert magnetic fields sufficient to erase information recorded within the memory cells. This exertion of magnetic fields provides for the elimination of data, thus the disabling of access or use of information due to the predetermined use factor. More specifically, once information is accessed or read, this use produces the magnetic field that destroys the recorded data. Further information regarding the fabrication of a memory cell utilizing MRAM technology can be found in U.S. Pat. No. 5,734,605, entitled "MULTI-LAYER MAGNETIC TUNNELING JUNCTION MEMORY CELLS", assigned to the same assignee, and incorporated by this reference.

Additional information on the fabrication of a perishable information storage mechanism such as that utilized for perishable media information storage mechanism media information storage mechanism 14 can be found in copending U.S. patent application, entitled, "PERISHABLE MEDIA INFORMATION STORAGE MECHANISM AND METHOD OF FABRICATION", bearing attorney docket no. CR 98-078, filed simultaneously herewith, assigned to the same assignee and incorporated herein by this reference.

Referring again to FIGS. 1 and 2, perishable media system 10 further includes an interpretation mechanism 18 in electrical interface with reader 16 utilizing a wired interconnect 20. It should be understood that a wireless interconnect, such as a radio frequency (RF) interconnect or an infra-red (IR) interconnect are anticipated by this disclosure. In this particular embodiment, interpretation mechanism 18 is fabricated as a typical visual image screen, such as a television, etc., but is should be understood that interpretation mechanism 18 would include any type of visual or audio interface. During operation data recorded on perishable media information storage mechanism 14 is read by reader 16 and relayed to interpretation mechanism 18 for interpretation, generally either through visual or audio means.

Thus, a new and improved perishable media system is disclosed. The system is intended for use when recorded information is not intended to last an extended period of time such as that found with durable medias. The elimination of recorded information is controlled by a predetermined use factor and specific materials included within a data layer that by interaction with a reader of the media system serves to eliminate access to data recorded thereon the media disc.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A perishable media system comprising:
 a means for writing information to a perishable media information storage mechanism, wherein the perishable media information storage mechanism includes a data layer for recording data thereon the media information storage mechanism, the data layer formed on an uppermost surface of a substrate and including a material responsive to a predetermined data access elimination use factor;
 a means for reading information written on the perishable media information storage mechanism; and
 a means for eliminating access to the information written on the perishable media information storage mechanism, the means for eliminating access to the information written on the perishable media information storage mechanism integrated with the means for reading the information.

2. A perishable media system as claimed in claim 1 wherein the means for writing information to the perishable media information storage mechanism includes media writer utilizing laser writer techniques.

3. A perishable media system as claimed in claim 1 wherein the means for reading information written on the perishable media information storage mechanism includes a media reader including a laser reading device.

4. A perishable media system as claimed in claim 1 wherein the means for eliminating access to the information written on the perishable media information storage mechanism includes a data access eliminator fabricated to interact with the perishable media information storage mechanism.

5. A perishable media system as claimed in claim 4 wherein the data access eliminator includes a laser light source.

6. A perishable media system as claimed in claim 4 wherein the data access eliminator includes a magnetic field.

7. A perishable media system as claimed in claim 4 wherein the means for eliminating data includes predetermined use factors.

8. A perishable media system comprising:
    a media writer for writing information to a perishable media information storage mechanism, wherein the perishable media information storage mechanism includes a data layer for recording data thereon the media information storage mechanism, the data layer formed on an uppermost surface of a substrate and including a material responsive to a predetermined data access elimination use factor;
    a media reader for reading information written on the perishable media information storage mechanism and relaying the information read to an interpretation mechanism; and
    a data access eliminator for eliminating access to the information written on the perishable media information storage mechanism, the data access eliminator integrated with the media reader.

9. A perishable media system as claimed in claim 8 wherein the media writer includes a data writing device.

10. A perishable media system as claimed in claim 8 wherein the media reader includes a data reading device.

11. A perishable media system as claimed in claim 8 wherein the data access eliminator includes a laser light source.

12. A perishable media system as claimed in claim 8 wherein the data access eliminator includes a magnetic field.

13. A perishable media system as claimed in claim 8 wherein the data layer includes a decayable dye material responsive to an exerted light for the elimination of access to data recorded thereon the media information storage mechanism based on a predetermined use factor.

14. A perishable media system as claimed in claim 8 wherein the data layer includes a liquid crystal memory cell including a liquid crystal material characterized as recording data therein, the liquid crystal memory cell responsive to an exerted bias for the elimination of access to data recorded thereon the media information storage mechanism based on a predetermined use factor.

15. A perishable media system as claimed in claim 8 wherein the data layer includes a photosensitive material responsive to an exerted light for the elimination of access to data recorded thereon the media information storage mechanism based on a predetermined use factor.

16. A perishable media system as claimed in claim 8 wherein the data layer includes a plurality of magnetoresistive memory cells fabricated using MRAM technology, the magnetoresistive memory cells responsive to an exerted magnetic field for the elimination of access to data recorded thereon the media information storage mechanism based on a predetermined use factor.

17. A method of operating a perishable media system comprising the steps of:
    providing a media writer for writing information to a perishable media information storage mechanism, the perishable media information storage mechanism including a data layer for recording data thereon the media information storage mechanism, the data layer formed on an uppermost surface of a substrate and including a material responsive to a predetermined data access elimination use factor;
    writing information to the perishable information storage mechanism;
    providing a media reader for reading information written on the perishable media information storage mechanism;
    integrating a data access eliminator with the media reader for eliminating access to the information written on the perishable media information storage mechanism;
    reading information written on the perishable media information storage mechanism;
    interpreting the recorded information with an interpretation mechanism; and
    eliminating access to the information written on the perishable media information storage mechanism.

18. A method of operating a perishable media system as claimed in claim 17 wherein the step of eliminating access to the information written on the perishable media information storage mechanism includes the step of generating a laser light that in combination with the data layer formed as a part of the perishable media information storage mechanism provides for the elimination of access to the information recorded on the perishable media information storage mechanism.

19. A method of operating a perishable media system as claimed in claim 17 wherein the step of eliminating access to the information written on the perishable media information storage mechanism includes the step of generating a magnetic field that in combination with the data layer formed as a part of the perishable media information storage mechanism provides for the elimination of access to the information recorded on the perishable media information storage mechanism.

* * * * *